Dec. 25, 1951 W. M. FLEMING 2,579,916
APPARATUS FOR FLUID FILLING OF CONTAINERS
Filed Nov. 5, 1949
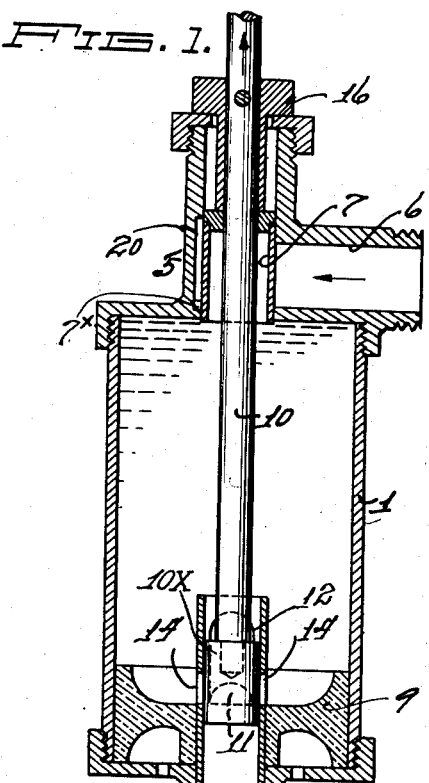
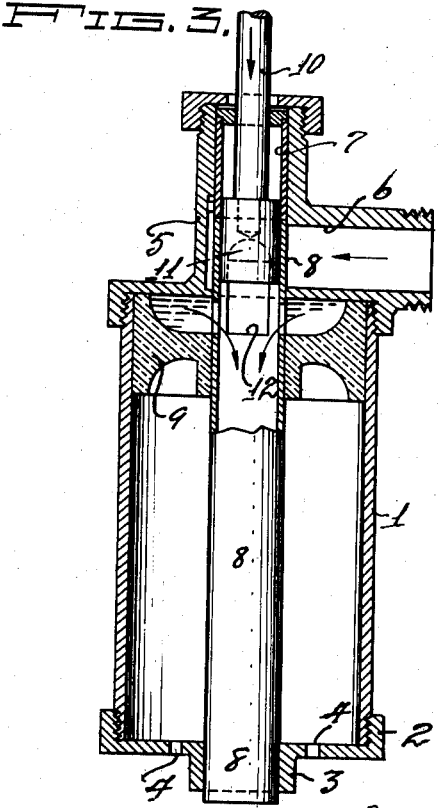
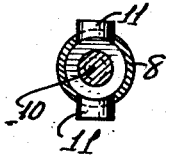
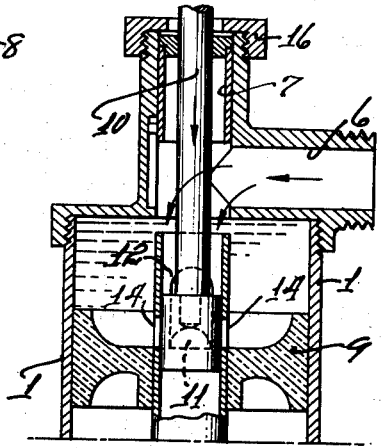
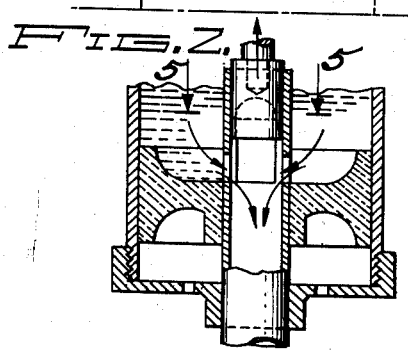

Patented Dec. 25, 1951

2,579,916

UNITED STATES PATENT OFFICE 2,579,916

APPARATUS FOR FLUID FILLING OF CONTAINERS

William M. Fleming, Nutley, N. J., assignor to Eskimo Pie Corporation, Bloomfield, N. J., a corporation of Delaware Application November 5, 1949, Serial No. 125,806

3 Claims. (Cl. 103—38)

The object of the present invention is to provide fluid filling means particularly adapted for rapidly filling containers with measured quantities of milk, and to avoid foaming of the milk, this being a serious objection in filling devices of the kind.

The characteristic of the present apparatus is the provision of a chamber for receiving a measured quantity of milk at the top of a piston, which is thrown into action as a pressure and milk-discharge element after the inflowing milk is automatically shut off. Air which may be carried into the bottle of milk is released during such inflow, and the discharge of the milk is controlled under sealed conditions so that foaming is eliminated. As the milk rises in the container, a milk outflow tube rises with, but somewhat below, the milk level, so that the milk itself, as the container fills, serves as a fluid seal.

The invention will be described with reference to the accompanying drawings, in which:

Figure 1 is a view in sectional elevation showing an embodiment of the invention applying to a milk container, the latter being shown in dotted lines. This view shows the apparatus in its position after the casing has received a measured quantity of milk.

Figure 2 is a fragmentary view in vertical section showing the apparatus at the beginning of its milk-discharge stroke.

Figure 3 is a view similar to Figure 2 showing the apparatus at the end of its upstroke.

Figure 4 is a fragmentary view in longitudinal section showing the apparatus shortly past the beginning of its milk-reception.

Figure 5 is a detailed view in cross section on the line 5—5, Figure 2.

Referring to the drawings, it will be seen that at 1 is shown a cylindrical casing to which is applied at its lower end a threaded closure 2, having an apertured neck 3 and air release ports 4.

The upper end of the casing 1 has threaded thereon a head, generally shown at 5. The head is formed with a cylindrical vertical valve chamber and with an inlet duct at 6.

Within the valve chamber is a sleeve valve 7 which is preferably the same diameter as a discharge tube 8 which projects downwardly through the axial apertured neck 3. Surrounding discharge tube 8 is a piston 9.

The means for raising and lowering the piston consists of a rod 10 which at its lower end carries lateral studs 11 which enter opposed elongated slots indicated at 12 formed in the discharge tube 8. Piston 9 is fixed to the discharge tube immediately below inlet ports at 14 formed in the discharge tube.

The lower end of rod 10 is provided with a head 10x proportioned to closely fit with discharge tube 8 and to serve as a valve closer therefor.

With the parts in the position of Fig. 1, it will be seen that on the preceding downward movement of rod 10 a member 16 thereon has engaged valve sleeve 7, moving the latter into closed position relative to the inlet 6. Also, in said downward movement the lower end of the rod has closed the ports 14 leading to the discharge tube 8. The casing has been filled with milk or other liquid, and the discharge tube has been projected into a container 18 for milk and the like. The device is ready for filling of that container.

Rod 10 in its upward movement first carries the lugs 11 from the lower ends of the elongated slots 12 to the upper ends thereof, and the rod also raises member 16 out of engagement with sleeve valve 7. It is to be noted that sleeve valve 7 carries a pin 7x which slides in a slot 20 formed in the casing head, so that the downward and upward movements of the sleeve are limited. In the continued upward movement of rod 10, the ports 14 being open, the piston exerts pressure upon the milk and it is forced out through the ports 14 and through the lower end of the discharge tube 8 as the latter rises, such action continuing until the piston reaches the position of Fig. 3. Preliminary to this position, the upper end of the discharge tube 8 reaches sleeve valve 7 and moves it into topmost position, so that the inlet 6 is cleared by the sleeve valve, but the inlet is closed by the upper end of the discharge tube.

In the downward movement of rod 10 from its position shown in Fig. 3, there will be a dwell of action until lugs 11 reach the lower ends of the slots 12, whereupon the discharge tube begins its downward movement and opens inlet duct 6, the parts now being in position of Fig. 4. This dwell of action is due to the fact that the piston 9 frictionally engages the casing 1 so as to form a tight liquid seal between the volume of the casing 1 above the piston 9 and the volume below the piston 9. This frictional engagement of the piston 9 with the casing 1 prevents the weight of the piston 9 and the fluid thereabove from forcing the piston 9 downwardly with respect to the rod 10, thereby maintaining the lug 11 at the top of the slot 12 until the end of the downward movement of the rod 10 and piston 9. Throughout the continued downward movement of the piston, milk will flow into the casing until, at the extreme lower position of the piston, member 16 has moved the sleeve valve 7 into closed position as shown in Fig. 1 and the device is ready for the upstroke and discharge of the milk or other fluid.

It will be understood that various modifications may be made in the form and arrangement of the elements illustrated in the drawings and constituting the embodiment therein shown, without departing from the spirit of the formation.

Having thus described my invention, what I claim and desire to secure by Letters Patent, is as follows:

1. In an apparatus for fluid filling of containers, a casing, a piston within the casing, a discharge tube to which the piston is connected, at least one inlet port for said discharge tube located above the piston, a valve head for controlling the said inlet port and disposed within the discharge tube, a rod connected to said valve head, means intermediate to the rod head and the discharge tube for permitting a predetermined idle movement of rod relative to the tube, in either of two directions, the rod being adapted to reciprocate the discharge tube, an inlet duct at the top of the casing, a valve closer for such inlet duct, and means, including the discharge tube, for actuating the said valve closer.

2. In an apparatus for fluid filling of containers, a casing, a piston within the casing, a discharge tube connected to the piston and projecting upwardly therefrom, a rod having a valve head within the discharge tube, means connecting the rod and the discharge tube and permitting a limited idle movement of the rod, inlet ducts formed in the discharge tube and adapted to be closed by said valve head, and thereby raising and lowering the piston and the discharge tube, inlet port at the top of the casing and means for opening and closing of said inlet port.

3. In an apparatus for fluid filling of containers, a casing, a base closure for the casing formed with an apertured neck, a detachable head for the casing formed with an upwardly projected apertured neck and with an inlet port, a piston with an axial aperture, a discharge tube fixed in said aperture and projecting downwardly in said neck, a rod having a valve head fitted within the discharge tube and adapted to close inlet ports therein, a means connecting the valve head and discharge tube for limited idle movement of the valve head, a sleeve valve in the neck of the head closing the top of the casing, and means including the discharge tube for actuating said sleeve valve as and for the purpose set forth.

WILLIAM F. FLEMING.

No references cited.